(12) United States Patent
Yao et al.

(10) Patent No.: US 9,481,836 B2
(45) Date of Patent: Nov. 1, 2016

(54) UPGRADING SUGAR-ALCOHOL DERIVED GAS OIL IN A GAS OIL HYDROCRACKER

(71) Applicant: PHILLIPS 66 COMPANY, Houston, TX (US)

(72) Inventors: Jianhua Yao, Bartlesville, OK (US); Sourabh S. Pansare, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 0 days.

(21) Appl. No.: 14/750,541

(22) Filed: Jun. 25, 2015

(65) Prior Publication Data

US 2015/0376514 A1 Dec. 31, 2015

Related U.S. Application Data

(60) Provisional application No. 62/017,390, filed on Jun. 26, 2014.

(51) Int. Cl.
*C10G 45/32* (2006.01)
*C10G 47/00* (2006.01)
*C10G 65/12* (2006.01)
*C10G 45/00* (2006.01)

(52) U.S. Cl.
CPC ............... *C10G 65/12* (2013.01); *C10G 45/00* (2013.01); *C10G 2300/1011* (2013.01); *C10G 2400/02* (2013.01); *Y02P 30/20* (2015.11)

(58) Field of Classification Search
CPC ......... C10G 1/00; C10G 45/32; C10G 47/00
USPC ............................. 585/240–242; 208/57, 49
See application file for complete search history.

(56) References Cited

U.S. PATENT DOCUMENTS

2008/0156694 A1* 7/2008 Chapus .................. C10G 45/02
208/61

* cited by examiner

*Primary Examiner* — Thuan D Dang
(74) *Attorney, Agent, or Firm* — Phillips 66 Company

(57) ABSTRACT

Biomass derived gas oil is blended with petroleum derived gas oil and upgrading into more salable and more valuable products by co-processing the blended material in a gas oil hydrocracking system comprising two reactors where the blended material is first hydrotreated and then hydrocracked.

9 Claims, 1 Drawing Sheet

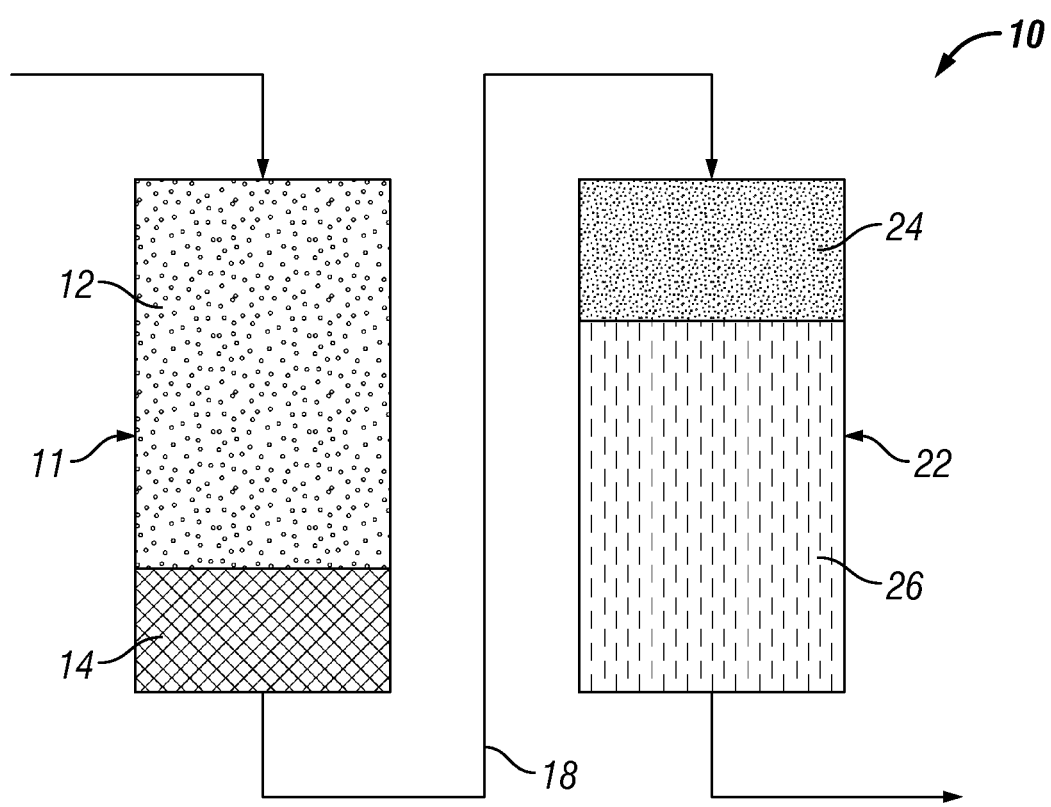

UPGRADING SUGAR-ALCOHOL DERIVED GAS OIL IN A GAS OIL HYDROCRACKER

CROSS-REFERENCE TO RELATED APPLICATIONS

This application is a non-provisional application which claims the benefit of and priority to U.S. Provisional Application Ser. No. 62/017,390 filed Jun. 26, 2014, titled "Upgrading Sugar-Alcohol Derived Gas Oil in a Gas Oil Hydrocracker," which is hereby incorporated by reference in its entirety.

STATEMENT REGARDING FEDERALLY SPONSORED RESEARCH OR DEVELOPMENT

None.

FIELD OF THE INVENTION

This invention relates to the conversion of bio-sourced materials to other useful compounds and more particularly to the cost efficient conversion of such materials to high value fuel suitable compounds.

BACKGROUND OF THE INVENTION

There is considerable interest in the development of alternative sources of fuels and chemicals, other than from petroleum resources. As the public discussion concerning the availability of petroleum resources and the need for alternative sources continues, it is anticipated that government mandates will expand the requirements for transportation fuels to include, at least in part, hydrocarbons derived from sources other than petroleum. As such, there is a need to develop alternative sources for hydrocarbons useful for producing fuels and chemicals.

One possible alternative source of hydrocarbons for producing fuels and chemicals is the natural carbon found in plants and animals. These so-called "natural" carbon resources (or renewable hydrocarbons) are widely available, and remain a target alternative source for the production of hydrocarbons. For example, it is known that carbohydrates and other sugar-based feedstocks can be used to produce ethanol, which has been blended with gasoline to provide an oxygenate to reduce emissions of uncombusted hydrocarbons. However, without government mandates, ethanol blending would diminish as it is not economically or energy efficient.

Carbohydrates, however, also can be used to produce fuel range hydrocarbons. The upgrading of biologically derived materials to materials useful in producing fuels is known in the art. However, many carbohydrates (e.g., starch) are undesirable as feed stocks due to the costs associated with converting them to a usable form. In addition, many carbohydrates are known to be "difficult" to convert due to their chemical structure, or that the hydrocarbon product produced is undesirable or will result in low quantities of desirable product. Among the compounds that are difficult to convert include compounds with low effective hydrogen to carbon ratios, including carbohydrates such as starches and sugars, carboxylic acids and anhydrides, lower glycols, glycerin and other polyols and short chain aldehydes. As such, efforts have been made to increase the effective hydrogen to carbon ratio of the materials including converting oxygenates in the presence of hydrogen, CO, steam, nitrogen, or other reactants, and by employing various catalysts. However, these processes are often complex and are costly, and the reaction products produced as a result of these processes are oftentimes undesirable or produce low weight percentage products, and often result in an increase in undesirable byproducts such as the production of carbon monoxide and carbon dioxide.

As such, development of a process for converting carbohydrates to hydrocarbons which yields significant quantities of desirable hydrocarbon products would be a significant contribution to the art. Furthermore, development of a conversion process for converting biological carbon to a hydrocarbon fuel or chemical product with reduced byproducts such as carbon monoxide and carbon dioxide, and reduced coke production, would be highly desirable.

BRIEF SUMMARY OF THE DISCLOSURE

The invention more particularly includes a process for co processing biomass derived gas oil stream with conventional petroleum derived gas oil to increase gasoline yield and middle distillate yield of a gas oil hydrocracker unit in an oil refinery. The process starts with biomass derived gas oil from a biomass conversion process and blends the biomass derived gas oil with petroleum derived gas oil to form a blended feedstock. The blended feedstock includes at least 0.5 percent of the biomass derived gas oil. The blended feedstock is fed along with hydrogen to a first reactor having a hydrotreating catalyst that tends to saturate carbon double bonds. The blended feedstock in the first reactor is hydrotreated to form a hydrotreated blended feedstock. The hydrotreated blended feedstock is fed along with hydrogen into a second reactor having a hydrocracking catalyst that tends to break longer chain hydrocarbons to two or more shorter chain hydrocarbons. The hydrotreated blended feedstock is then hydrocracked in the second reactor to form a cracked product and the cracked product is fractionated to recover gasoline and middle distillates from the cracked product.

BRIEF DESCRIPTION OF THE DRAWINGS

A more complete understanding of the present invention and benefits thereof may be acquired by referring to the follow description taken in conjunction with the accompanying drawing in which:

FIG. 1 is a schematic drawing of a system for upgrading biomass derived gas oil to salable products.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

In a process for converting biomass to hydrocarbons, most hydrocarbon products must meet rather stringent specifications to be marketable. One biomass conversion process described in U.S. patent application Ser. No. 13/693,718, filed on Dec. 4, 2012, which is incorporated by reference herein, produces three preferred fractions: gasoline, diesel and gas oil. While the gasoline and diesel fractions can be directly blended with their conventional counterparts and sold as motor fuel, the gas oil fraction is more easily salable if it were to be processed and upgraded into other products. One of the challenges when processing and upgrading biomass derived hydrocarbons is the cost of such additional processing and upgrading. One key to producing an economically sustainable biomass to fuel manufacturing system is developing a conversion process that includes the fewest possible or practical steps. Each additional step to convert biomass likely adds significantly to the capital cost of the system while also adding to the complexity and operating cost for any such project. Considering that these systems are not very profitable (or there would already be many in commercial operation) controlling and containing costs is imperative for commercial success. Each additional step in the process may include another reaction vessel, more catalyst, and more control systems.

One way to reduce steps in a biomass to hydrocarbon fuels process is to utilize existing infrastructure and existing systems, when available and compatible. As such, it is quite attractive to co-process bio-derived materials with petroleum derived hydrocarbons in an existing refinery rather than designing, constructing and operating completely separate units. While biomass will likely require specific conversion steps not existing in conventional refineries, there are various process steps within refineries that are generally applicable for partially converted biomass. For example, it is common in refineries to have systems to hydroprocess certain hydrocarbon products to eliminate carbon double bonds or to remove sulfur and nitrogen atoms to meet clean emission or environmental requirements or remove oxygen to meet trade specifications and produce salable fuel. It is likely that biomass products will need similar hydroprocessing type treatments, but there are significant considerations as to whether the systems in any refinery are specifically suitable for the biomass converted products and whether running biomass converted products will upset the operations of the unit and of the refinery itself. There are also collateral issues related to balancing systems within refineries to match the products from each unit which may have produced more or less of certain products using a different feedstock. As such, there will be resistance to including biomass derived feedstocks without considerable testing and assurances that the effort is worth the trouble. According to the present invention, gas oil produced from biomass and specifically from sugar alcohol may be successfully co-processed with petroleum-based gas oil under the conditions essentially equivalent to known hydrocracker conditions in at least one commercially operating refinery.

Referring now to FIG. 1, experiments were carried out in a laboratory system, generally indicated by the arrow 10 with two reactors in series that simulates known hydrocracker arrangements in an operating refinery. The configuration of catalyst loading is illustrated in FIG. 1 where reactor 11 serves as a pre-treater and is loaded with 71 vol % of a NiMo gas oil hydrotreating catalyst in bed 12 and 29 vol % of a base metal mild hydrotreating catalyst in bed 14. Reactor 11 was operated at 1600 psig with 3000 scf/b of hydrogen to oil ratio and at a throughput of 1.5 hr$^{-1}$. Reactor 11 operating temperature was adjusted gradually to achieve a nitrogen slip of about 15 ppm. The temperature of reactor 11 was 700° F.

Once the reactor 11 was operating at stable conditions with a nitrogen slip of about 15 ppm, the products were directed via conduit 18 to reactor 22. The catalyst beds 24 and 26 in reactor 22 contained 14 vol % of a base metal naphtha hydrocracking catalyst on the top of a base metal flexible hydrocracking catalyst which comprised 86 vol %. This type of catalyst is known for being flexible in that the severity of the hydrocracking performed by the catalyst may be altered by altering the conditions in bed 26. It is worth mentioning that, prior to the catalyst performance test, catalysts in the reactor 11 (the pre-treater) and reactor 22 (the hydrocracker) were both presulfided with DMDS using standardized Cat Lab pre-sulfiding methods.

Preliminary screening tests were conducted with three cases: Case A which is the base case having with 100% petroleum derived based gas oil as the feed; Case B which is similar to Case A with 10 wt % of the petroleum derived gas oil replaced with sugar alcohol derived gas oil; and Case C, which is also similar to Case A, but with an additional 10 wt % sugar alcohol derived gas oil added to the full 100 % volume of the Case A feed (creating 110 % of the volume of Case A).

Table I lists the properties of the Case A and Case B feeds. The Case A petroleum-based gas oil was very light and only had 31.75 wt % of 680° F.+ fraction, while the Case B mixture had 36.23 wt % of 680° F.+ fraction and was heavier than the petroleum-based gas oil, suggesting this particular sugar alcohol derived gas oil staple was much heavier than the petroleum-based gas oil. Based on SimDis information of both feeds, the calculated content of 680° F.+ fraction in the pure sugar alcohol-derived gas oil should be at least 76 wt %, which is more than twice as much as in the petroleum-based gas oil.

TABLE I

|  | Case A | Case B |
|---|---|---|
| Feed properties |  |  |
| Density at 38.5 C., g/ml | 0.8941 | 0.8966 |
| API Gravity at 38.5 C. | 23.84 | 23.41 |
| Calculated density at 60 F., g/ml | 0.9100 | 0.9125 |
| Calculated Specific Gravity at 60 F. | 0.9109 | 0.9134 |
| Hydrogen, wt % | 11.51 | 11.51 |
| Sulfur, wt % | 1.09 | 1.00 |
| Total Nitrogen, ppm | 621.0 | 438.0 |
| Basic Nitrogen, ppm | 97.6 | 83.8 |
| Oxygen content by AED-O, wt % | — | 0.07 |
| Hydrocarbon type (NOISE), wt % |  |  |
| Paraffins | 26.3 | 25.7 |
| Cyclanes | 31.1 | 32.1 |
| Mono-aromatics | 16.1 | 17.6 |
| Di-aromatics | 19.6 | 18.3 |
| Tri-aromatics | 6.6 | 6.0 |
| Tetra-aromatics | 0.3 | 0.3 |
| Pent-aromatics | 0.0 | 0.0 |
| Total Aromatics | 42.6 | 42.2 |
| iso/n paraffin ratio | 0.8 | 0.8 |
| Average C# of paraffins | 19.2 | 19.2 |
| Average# of C | 17.6 | 18.0 |
| Average # of H | 30.1 | 30.9 |
| Average molecular weight | 243.7 | 248.4 |
| SimDis (D7169), ° F. |  |  |
| IBP | 279 | 276 |
| 5% | 405 | 411 |
| 10% | 439 | 446 |
| 20% | 493 | 508 |
| 30% | 541 | 560 |
| 40% | 582 | 599 |
| 50% | 619 | 632 |
| 60% | 653 | 667 |
| 70% | 686 | 703 |
| 80% | 724 | 743 |
| 90% | 773 | 799 |
| 95% | 810 | 859 |
| EBP | 941 | 1220 |
| 0-380° F. | 2.8 | 2.7 |
| 380-680° F. | 65.4 | 61.1 |
| 680° F.+ | 31.8 | 36.2 |

Table II contains the product yield information for all three cases. Case A (base case with petroleum-based gas oil feed only) and Case B (replacing 10% petroleum-based gas oil with sugar alcohol-derived gas oil) was operated at an identical condition to examine the effect of sugar alcohol-derived gas oil on hydrocracking performance. As compared to Case A, the presence of sugar alcohol-derived gas oil did shift the product yield to be more selective to diesel production. When 10% of sugar alcohol-derived gas oil was blended in the feed, it increased diesel yield by about 5.4 wt %, reduced the light gas (C1-C4) make by about 1.8 wt %, and reduced naphtha yield by about 7.72 wt %.

TABLE II

|  | Case A | Case B | Case C |
|---|---|---|---|
| Operating Conditions |  |  |  |
| Temperature, ° F. (1st Rx/2nd Rx) | 700/720 | 700/720 | 700/720 |
| Pressure, psig | 1600 | 1600 | 1600 |
| LHSV | 1.5 | 1.5 | 1.65 |
| $H_2$ to oil ratio, scf/bbl | 3000 | 3000 | 2727 |
| Product Yield, wt % of fresh feed |  |  |  |
| C1-C4 | 4.0 | 2.2 | 2.9 |
| C5-380° F. | 40.6 | 32.9 | 31.7 |
| 380-680° F. | 46.3 | 51.6 | 51.6 |
| 680° F.+ | 10.7 | 14.6 | 15.1 |
| 680° F.+ conversion, wt % | 66.3 | 59.7 | 58.4 |

Regarding the gas oil conversion, Case B is about 7% lower than case A. However, as discussed earlier, Case B's feed consisted of 36.23 wt % of 680° F.+ fraction, which is about 5 wt % higher than that of Case A. Even though the gas oil conversion is lower for Case B, the amount of 680° F.+ fraction converted for both cases is almost identical as illustrated in Table III. This calculation assumed a total of 1000 lbs. of feed to be processed for both cases. Based on the weight percentage of 680° F.+ in feed and in product, the weight of 680° F.+ fraction that was converted in each case was calculated. Case A converted about 210 lbs. of 680° F.+ fraction and case B converted about 216 lbs. of 680° F.+ fraction indicating that the system in both cases converted similar amounts of the 680° F.+ fraction. This comparison suggests that the presence of sugar alcohol-derived gas oil did not inhibit the petroleum gas oil conversion. The reduction of gas oil conversion can be attributed primarily to the higher content of 680° F.+ fraction in the feed of Case B.

TABLE III

|  | Case A | | Case B | |
|---|---|---|---|---|
|  | Feed | Product | Feed | Product |
| 680° F.+ wt % Assuming 1000 lbs. of total feed: | 31.8 | 10.7 | 36.2 | 14.6 |
| 680° F.+, lbs. | 318 | 107 | 362 | 146 |
| Δ = Converted 680° F.+, lbs. | | 210 | | 216 |

Table IV shows the product properties for all three cases. As expected, the density of product for Case A is lower than densities for Case B and C because products from Cases B and C contains more diesel and gas oil as compared with product from Case A.

TABLE IV

|  | Case A | Case B | Case C |
|---|---|---|---|
| Overall Product properties |  |  |  |
| Density at 38.5° C., g/ml | 0.79364 | 0.80898 | 0.81074 |
| API Gravity at 38.5° C. | 42.9 | 39.72 | 39.36 |
| Calculated Density at 60° F., g/ml | 0.8106 | 0.8256 | 0.8273 |
| Calc. SpOr at 60 F. | 0.8114 | 0.8264 | 0.8281 |
| Hydrogen, wt % | 0.1388 | 0.1361 | 0.1356 |
| Sulfur, ppm | 11 | 15.73 | 25 |
| Total Nitrogen, ppm | 9.5 | 2.6 | 6.1 |
| Basic Nitrogen, ppm | <0.5 | <0.5 | <0.5 |
| Hydrocarbon type (NOISE), wt % |  |  |  |
| Paraffins | 26.5 | 24.1 | 24.4 |
| Cyclanes | 65.9 | 66.8 | 64.7 |
| Mono-aromatics | 7.4 | 8.8 | 10.3 |
| Di-aromatics | 0.2 | 0.3 | 0.5 |
| Tri-aromatics | 0.02 | 0.03 | 0.05 |
| Tetra-aromatics | 0 | 0 | 0 |
| Total Aromatics | 7.6 | 9.1 | 10.9 |
| iso/n paraffin ratio | 2.0 | 1.6 | 1.6 |
| Average C# of paraffins | 17.7 | 18 | 18.1 |
| Average # of C | 12.9 | 13.6 | 13.8 |
| Average # of H | 25.3 | 26.3 | 26.6 |
| Average molecular weight | 180.4 | 189.5 | 192 |
| SimDis (D7169), ° F. |  |  |  |
| IBP | 88 | 92 | 92 |
| 5% | 183 | 202 | 201 |
| 10% | 218 | 244 | 244 |
| 20% | 275 | 320 | 321 |
| 30% | 328 | 379 | 382 |
| 40% | 378 | 423 | 426 |
| 50% | 421 | 469 | 473 |
| 60% | 470 | 526 | 531 |
| 70% | 535 | 585 | 588 |
| 80% | 605 | 648 | 651 |
| 90% | 689 | 720 | 724 |
| 95% | 742 | 770 | 773 |
| EBP | 852 | 884 | 887 |

Table V illustrates the properties of diesel fraction from Case B and Case C. Oxygen content in both diesel samples is below the detection limit, suggesting that the hydrocracking process was able to completely remove any oxygen residues in the sugar alcohol-derived gas oil. Other diesel properties are within diesel specification. The results indicate that hydrocracking appears to be a viable and attractive option to upgrade the sugar alcohol-derived gas oil.

TABLE V

| Properties of Diesel Fraction (380-680° F.) | Case B | Case C |
|---|---|---|
| AED-O, wt % | <0.01 | <0.01 |
| Density @38.5° C. | 0.8263 | 0.8278 |
| API Gravity @38.5 C. | 36.26 | 35.97 |
| Calculated Density 60° F. | 0.8427 | 0.8441 |
| Calculated Specific Gravity 60° F. | 0.8435 | 0.8449 |
| Hydrogen wt % | 13.49 | 13.43 |
| Cloud, F. | 1 | 2 |
| Pour, F. | −5 | −5 |
| Flash Point, F. | 190 | 194 |
| Cetane by IQT | 53.7 | 52.4 |

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A process for co-processing biomass derived gas oil stream with conventional petroleum derived gas oil thereby increasing the gasoline yield and middle distillate yield of a gas oil hydrocracker unit in an oil refinery comprising:
   a) providing a biomass derived gas oil from a biomass conversion process;
   b) blending the biomass derived gas oil with petroleum derived gas oil to form a blended feedstock such that the biomass derived gas oil comprises at least 0.5 percent of the blended feedstock;
   c) feeding the blended feedstock along with hydrogen to a first reactor having a hydrotreating catalyst that tends to saturate carbon double bonds;
   d) hydrotreating the blended feedstock in the first reactor to form a hydrotreated blended feedstock;
   e) feeding the hydrotreated blended feedstock along with hydrogen into a second reactor having a hydrocracking catalyst that tends to break longer chain hydrocarbons to two or more shorter chain hydrocarbons;
   f) hydrocracking the hydrotreated blended feedstock in the second reactor to form a cracked product; and
   g) fractionating the cracked product to recover gasoline and middle distillates from the cracked product.

2. The process according to claim 1, wherein the biomass derived gas oil is sugar alcohol derived gas oil.

3. The process according to claim 1 wherein the first reactor also includes a hydrocracking catalyst with the hydrotreating catalyst.

4. The process according to claim 1 wherein the blended feedstock comprises about 10 wt % biomass derived gas oil and about 90% wt % petroleum derived gas oil.

5. The process according to claim 1 wherein the hydrotreating catalyst is a hydrotreating catalyst.

6. The process according to claim 1 wherein the hydrocracking catalyst in the first reactor is a mild hydrocracking catalyst.

7. The process according to claim 1 wherein the hydrocracking catalyst in the second reactor is a naphtha hydrocracking catalyst.

8. The process according to claim 1 wherein the second hydrocracking catalyst in the second reactor is a hydrocracking catalyst.

9. The process according to claim 1 where the biomass derived gas oil is combined with the petroleum derived gas oil in a ratio of biomass derived to petroleum derived of between about 0.1 to 20 and about 1 to 1.

* * * * *